United States Patent [19]
Cook et al.

[11] 3,744,819
[45] July 10, 1973

[54] COUPLING DEVICE FOR MOLTEN METAL CARRIER

[75] Inventors: Henry S. Cook; Robert E. Schwartz, both of Owensboro, Ky.

[73] Assignee: National-Southwire Aluminum Company, Carrollton, Ga.

[22] Filed: Sept. 28, 1971

[21] Appl. No.: 184,383

[52] U.S. Cl. .............................. 280/477, 280/515
[51] Int. Cl. ............................................. B60d 1/02
[58] Field of Search .................... 280/477, 475, 515

[56] References Cited
UNITED STATES PATENTS

| | | | |
|---|---|---|---|
| 2,671,673 | 3/1954 | Benson | 280/477 |
| 2,844,390 | 7/1958 | Smith | 280/477 |
| 3,326,575 | 6/1967 | Shepley | 280/515 |
| 2,441,285 | 5/1948 | Pfeiffer | 280/477 |
| 3,627,352 | 12/1971 | Canole | 280/475 |
| 1,384,944 | 7/1921 | Flood | 280/477 |

*Primary Examiner*—Leo Friaglia
*Attorney*—Van C. Wilks, Herbert M. Hanegan et al.

[57] ABSTRACT

This disclosure relates to a coupling device for connecting a molten metal carrier to a draft vehicle. The coupling device includes a pin slidable within a housing and engageable with a ring portion of a draw bar of the carrier. Actuation of the pin to engage and disengage the draw bar is accomplished by a cable connected to the pin and extending to a control lever in the draft vehicle. A guide ramp extending from the housing permits the operator of the draft vehicle to hook-up to the carrier as well as to engage and disengage the draw bar without alighting from the vehicle.

10 Claims, 6 Drawing Figures

PATENTED JUL 10 1973 3,744,819

INVENTORS
HENRY S. COOK
ROBERT E. SCHWARTZ

BY Van C. Wilks &
Herbert M Hanegan
ATTORNEYS

PATENTED JUL 10 1973 3,744,819

COUPLING DEVICE FOR MOLTEN METAL CARRIER

SUMMARY OF THE INVENTION

This invention relates generally to the aluminum reduction industry, and more particularly to means facilitating transportation of molten aluminum within a reduction plant.

In the operation of an aluminum reduction plant, large crucibles are used to transport molten aluminum from the reduction cells to the pig pouring operation, as well as to various locations within the plant generally. Because of the magnetic fields existing in the reduction cells as a result of the electrical current used in the reduction process, the handling of the metal crucibles is rendered more difficult and dangerous. Consequently, it is desirable to eliminate as much of the manual handing of the crucibles and their associated transport apparatus as possible.

One method of transporting a crucible of molten aluminum is to load the crucible on a carrier or trailer and then connect the trailer to a tractor or other type draft vehicle. However, the operation of connecting the trailer to the tractor involves the use of a workman who must manually couple the tongue or draw bar of the carrier to the tractor, in addition to the operator of the tractor who must maneuver his vehicle into the proper position. This operation is often time-consuming and hazardous and is rendered more difficult and dangerous owing to the particular nature of conditions existing in aluminum reduction plants.

It is a primary object of this invention, therefore, to provide apparatus which facilitates safe and expeditious transportation of molten aluminum crucibles within an aluminum reduction plant.

More particularly, it is an object of this invention to provide a novel coupling device for connecting a molten metal carrier to a draft vehicle.

Another object of this invention is to provide a coupling device for connecting a drawn vehicle to a draft vehicle which permits the operator of the draft vehicle to hook-up to the drawn vehicle as well as to engage and disengage the coupling device without alighting from the vehicle and without the assistance of another workman.

Briefly, these objects are accomplished by providing a coupling device adapted to be connected to the back of a tractor or other type draft vehicle and including a housing having a pin slidable therein which is engageable with a ring portion of a draw bar extending from a carrier vehicle. Actuation of the pin to engage and disengage the draw bar is accomplished by a cable connected to the pin and extending to a control lever in the operator's compartment of the tractor. An inclined guide ramp extending outwardly and downwardly from the housing provides a funnel-type guide which permits the operator to maneuver the tractor to receive the draw bar on the inclined ramp which guides it into the interior of the housing where it may be engaged by the slidable pin.

With the above and other objects in view that may hereinafter appear, the nature of the invention may be more clearly understood by reference to the several views illustrated in the accompanying drawings, the following detailed description thereof, and the appended claimed subject matter.

DESCRIPTION OF THE PREFERRED EMBODIMENTS

Figure 1:
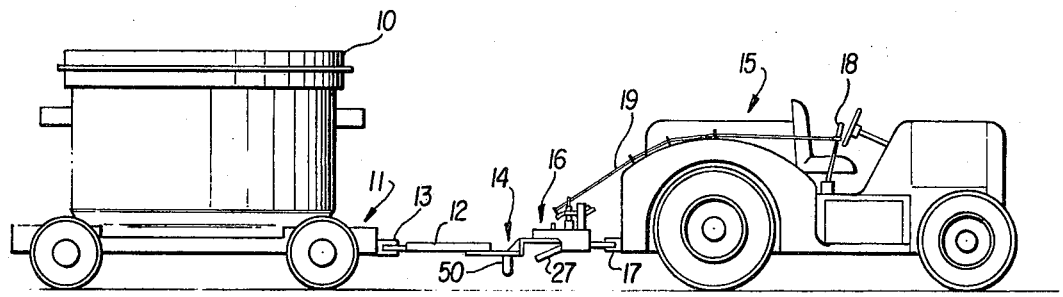
FIG. 1 is an elevation view of a carrier transporting a crucible of molten aluminum, a tractor adapted to pull the carrier, and the coupling device of this invention carried by the tractor and connected to the draw bar of the carrier.

Referring now to the drawings in detail, there is illustrated in FIG. 1 a crucible 10 adapted to contain molten aluminum or other metals. The crucible 10 is mounted on a carrier 11 having a tongue 12 pivotally connected thereto by means of a pivot joint 13. A draw bar attachment 14 is suitably connected to the tongue 12.

The carrier 11 is adapted to be pulled by a tractor 15 having a coupling device 16 mounted thereon by means of a pivot joint 17. The carrier 11 is connected to the tractor 15 by means of the coupling device 16 which receives and engages the draw bar 14 in a manner to be hereinafter described. The coupling device 16 may be actuated by the operator of the tractor 15 by a control lever 18 through a cable 19 which extends from the control lever 18 back to the coupling device 16.

Figure 2:
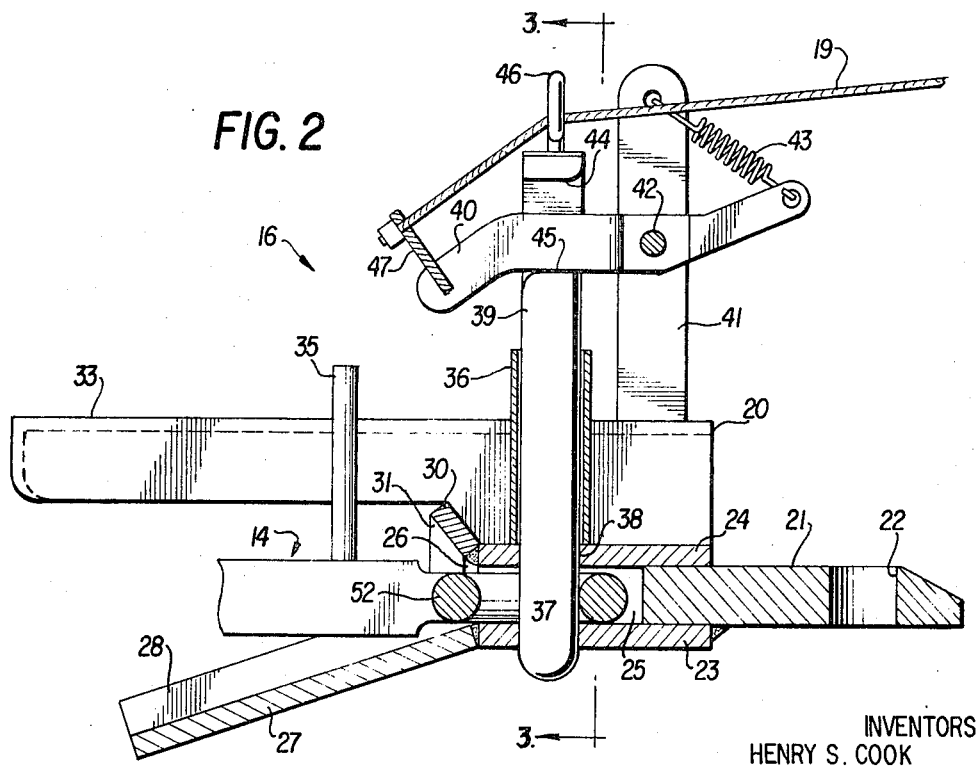
FIG. 2 is an enlarged fragmentary elevation view, partly in section, of the coupling device of this invention, and illustrates the coupling pin engaged with the ring portion of the draw bar.
Figure 3:
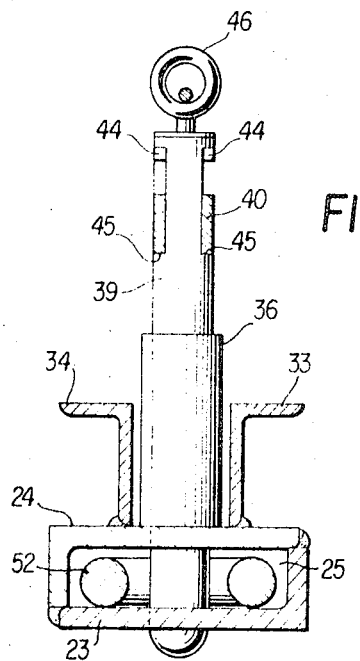
FIG. 3 is a vertical sectional view taken along line 3—3 of FIG. 2, and illustrates the manner in which the bifurcated actuating lever coacts with the cam surfaces of the coupling pin.
Figure 4:
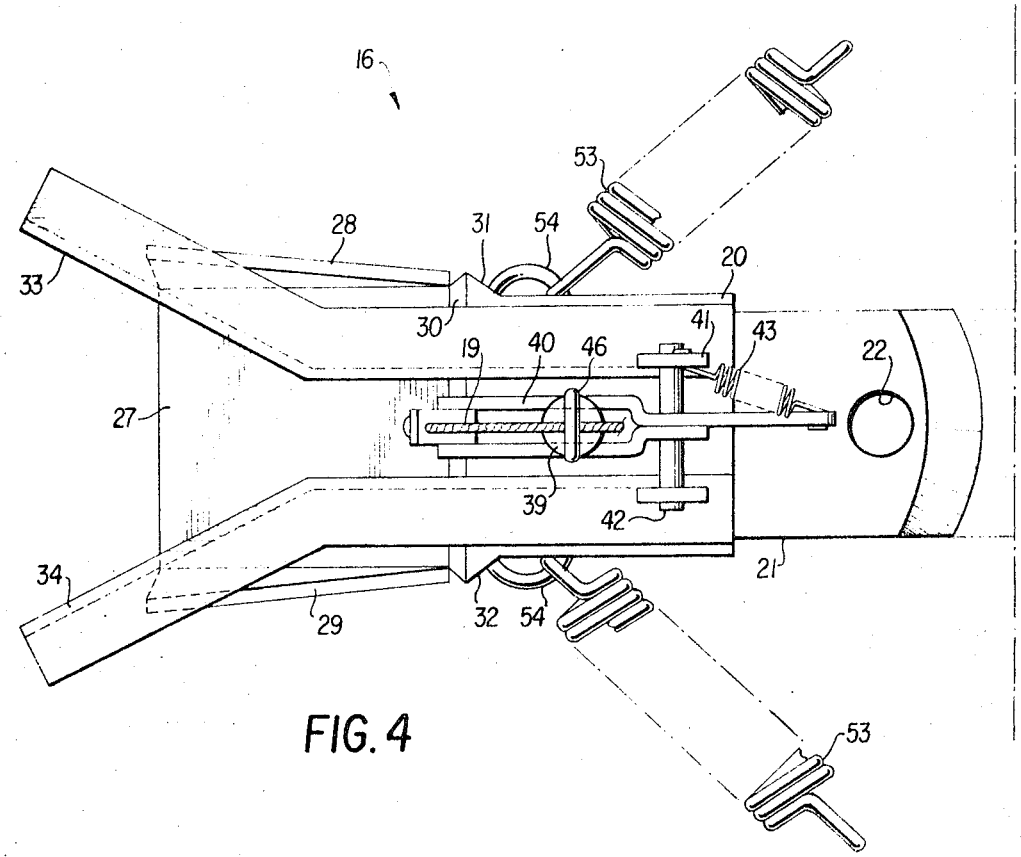
FIG. 4 is a plan view of the coupling device, and illustrates the inclined ramp and flared housing portions which function to guide the draw bar into the housing.

As seen most clearly in FIGS. 2 and 4, the coupling device 16 includes a housing 20 having a mounting plate 21 through which extends a vertical bore 22 by means of which the coupling device 16 is connected to the pivot join 17 of the tractor 15. The housing 20 also includes L-shaped flanges 23, 24 (see FIG. 3) which together with the plate 21 define an interior coupling chamber 25 having an opening or mouth 26 on one side thereof for reception of the draw bar 14. An inclined ramp 27 having vertical side walls 28, 29 extends downwardly and rearwardly from the mouth 26. Similarly, a smaller plate 30 having vertical side walls 31, 32 extends upwardly from the mouth 26. In a manner to be hereinafter described, the ramp 27 and the plate 30, along with their associated side walls 28, 29 and 31, 32, respectively, serve as a funnel to guide the draw bar 14 into the coupling chamber 25. The housing 20 also includes rearwardly extending flared arms 33, 34 which are disposed over the ramp 27 and function to additionally guide the draw bar 14 into the chamber 25 in association with a guide stud 35 carried by the draw bar 14.

The housing 20 further includes a vertically disposed bushing or sleeve 36 mounted on top of the flange 24 and which is concentric with holes 37 and 38 formed in the flanges 23 and 24, respectively. A coupling pin 39 is slidably received in the sleeve 36 and is adapted to extend through the holes 37 and 38 in the flanges 23 and 24. The pin 39 is actuated by a bifurcated lever 40 which is pivotally mounted by means of a pin 42 on a support bracket 41 extending from the housing 20. The lever 40 is biased in the counterclockwise direction as viewed in FIG. 2 by means of a coil spring 43 which is connected to the bracket 41.

Figure 6:
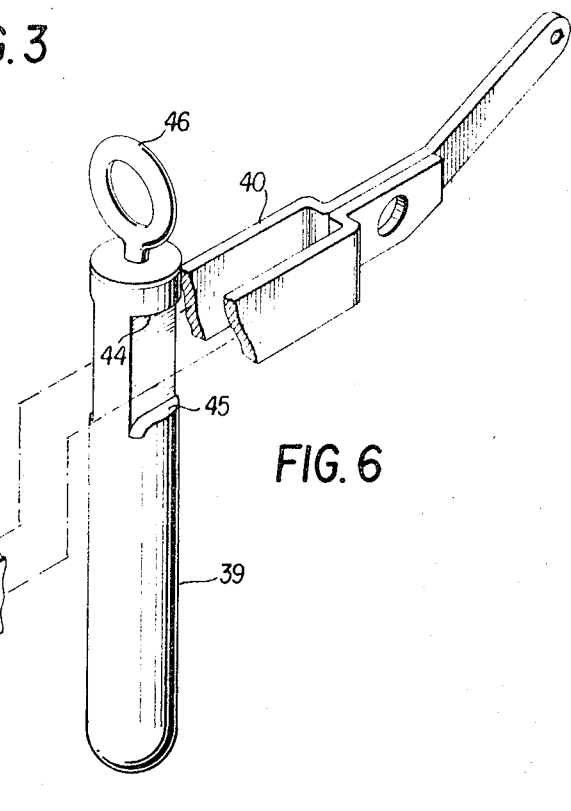
FIG. 6 is a cut-away and exploded perspective view of the coupling pin and actuating lever.

As seen most clearly in FIGS. 2, 3 and 6, the bifurcated level 40 coacts with the pin 39 through undercut cam surfaces 44, 45 formed in opposite sides of the pin 39. The normal tendency is for the lever 40 to urge the pin 39 downwardly through the force exerted by the spring 43 as the lever 40 engages the cam surfaces 45. The pin 39 may be raised, on the other hand, through the cable 19 which extends through a guide ring 46 on the top of the pin 39 and is connected to a mounting plate 47 carried by the lever 40. Actuation of the control lever 18 forwardly as seen in FIG. 1 will cause the cable 19 to pivot the lever 40 clockwise about the pin 42 thereby engaging the cam surfaces 44 and raising pin 39.

Figure 5:
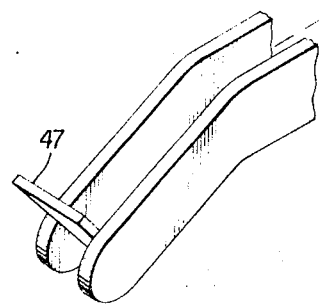
FIG. 5 is a perspective view of the draw bar, and illustrates the ring portion which is adapted to receive the coupling pin.
Figure 5:
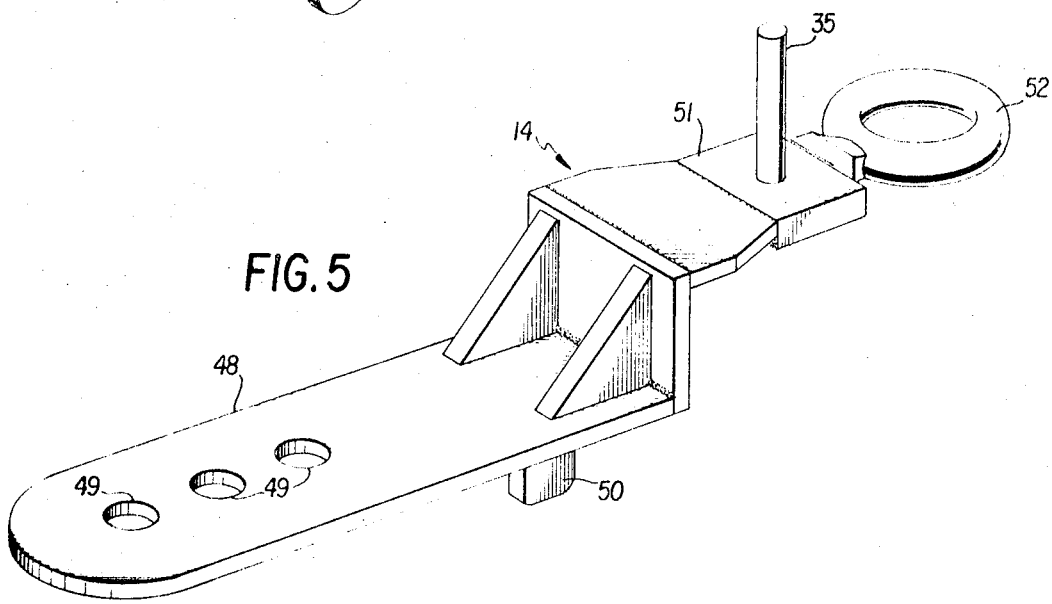

Referring now to FIG. 5, there are illustrated details of the draw bar 14. The draw bar 14 includes a plate 48 having a plurality of holes 49 formed therein by means of which the draw bar 14 may be bolted to the tongue 12 of the carrier 11 or other drawn vehicle. A support or foot 50 extends downwardly from the plate 48 for a purpose to be hereinafter explained. The draw bar 14 also includes an elevated forward portion 51 on which is mounted the guide stud 35 and from which extends an eyelet or ring portion 52 by which the draw bar 14 is engaged and secured by the coupling device 16.

The operation of the coupling device 16 should be readily apparent in view of the foregoing description. When the draw bar 14 is disconnected from the coupling device 16, the nature of the pivot joint 13 will permit the tongue 12 and draw bar 14 to tilt downwardly. However, the support or foot 50 will support the ring portion 52 of the draw bar 14 at an elevation corresponding to the elevation of the inclined ramp 27 of the coupling device 16. Therefore, if it is desired to connect the trailer 11 to the tractor 15, the operator of the tractor 15 need merely maneuver his vehicle until the ring portion 52 is received on the ramp 27 of the coupling device 16 with the guide stud 35 received between and guided by the flared arms 33, 34 of the housing 20. Further backing of the tractor 15 towards the trailer 11 will cause the draw bar 14 to be lifted on the guide ramp 27 and guided by the funnel provided by the side walls 28, 29, 31, 32 and the plate 30 through the mouth 26 until the ring portion 52 is received within the coupling chamber 25 as shown in FIG. 2. At this point, the control lever 18 is released by the operator of the tractor 15 such that the lever 40 is pivoted in the counterclockwise direction and the coupling pin 39 forced down through the coupling chamber 25 to engage the ring portion 52 of the draw bar 14. Release of the draw bar 14 is accomplished by, of course, simply pushing the control lever 18 forward to raise the coupling pin 39 out of engagement with the ring portion 52.

As seen in FIG. 4, the coupling device 16 may be provided with coil springs 53 which are hooked at one end to rings 54 carried by the housing 20, and suitably fastened at their other ends to the tractor 15 as to limit and restrain the degree of pivotal movement of the coupling device 16.

In view of the foregoing, it should be readily apparent that there is provided in accordance with this invention a novel coupling device which permits the operator of a draft vehicle to hook-up to the draw bar of a drawn vehicle as well as to engage and disengage the coupling device without alighting from the vehicle and without the assistance of another workman. The novel combination of guide ramps and funnel-like guide surfaces permits fast and accurate alignment of the draw bar and coupling means, and facilitates safe and expeditious transportation of the drawn load.

Although only a preferred embodiment of the invention is specifically illustrated and described herein, it is to be understood that minor variations may be made without departing from the spirit of the invention.

We claim:

1. A coupling device adapted to connect a draw bar of a drawn vehicle to a draft vehicle comprising a draw bar having vertically extending guide means adjacent its forward end, a housing having coupling means slidably received therein, an inclined ramp extending below said housing and guide arms spaced above and extending over at least a substantial portion of said ramp and engageable with said vertically extending guide means for guiding said draw bar into the interior of said housing, means for actuating said coupling means to engage and disengage said draw bar, and means remote from said coupling means for operating said actuating means whereby the drawn vehicle may be connected and disconnected from the draft vehicle solely by the operator of the draft vehicle without alighting therefrom.

2. A coupling device as defined in claim 1 wherein said coupling means includes a pin slidable in a sleeve in a direction transverse to the disposition of said draw bar within said housing.

3. A coupling device as defined in claim 2 wherein said pin includes cam surfaces engageable with said actuating means.

4. A coupling device as defined in claim 3 wherein said actuating means includes a bifurcated lever biased to urge said pin in an engaged position with said draw bar.

5. A coupling device as defined in claim 1 wherein said means remote from said coupling includes a cable connected to said actuating means and extending to a control lever in the draft vehicle.

6. A coupling device as defined in claim 1 wherein said draw bar includes a ring portion adapted to receive said coupling means.

7. A coupling device as defined in claim 1 wherein said draw bar includes foot means adapted to support said draw bar a predetermined distance above the ground corresponding to the elevation of said ramp, whereby said draw bar is adapted to be lifted and guided into said housing by said ramp as said draw bar and said housing are brought together.

8. A coupling device as defined in claim 1 wherein means integral with said housing are provided for lifting said draw bar into said housing as said draft vehicle is connected to said drawn vehicle.

9. A coupling device as defined in claim 1 wherein said draw bar includes foot means for supporting said draw bar a predetermined distance above the ground when said foot means is in contact with the ground, said inclined ramp raising said foot means from the ground and guiding said draw bar into said housing as said draft vehicle is connected to said drawn vehicle.

10. A coupling device as defined in claim 1 wherein said vertically extending guide means includes a guide stud mounted on said draw bar and extending vertically therefrom and adapted to cooperate with said guide arms during coupling.

* * * * *